US011865842B2

(12) United States Patent
Fujisawa

(10) Patent No.: US 11,865,842 B2
(45) Date of Patent: Jan. 9, 2024

(54) CLEANING UNIT, LIQUID EJECTING APPARATUS, AND METHOD FOR REPLACING CLEANING UNIT

(71) Applicant: SEIKO EPSON CORPORATION, Tokyo (JP)

(72) Inventor: Kazutoshi Fujisawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/651,304

(22) Filed: Feb. 16, 2022

(65) Prior Publication Data

US 2022/0258475 A1 Aug. 18, 2022

(30) Foreign Application Priority Data

Feb. 16, 2021 (JP) ................................. 2021-022747

(51) Int. Cl.
*B41J 2/165* (2006.01)

(52) U.S. Cl.
CPC ....... *B41J 2/16538* (2013.01); *B41J 2/16535* (2013.01); *B41J 2/16544* (2013.01); *B41J 2/16517* (2013.01)

(58) Field of Classification Search
CPC ................ B41J 2/16538; B41J 2/16535; B41J 2/16544; B41J 2/16517; B41J 2/16508; B41J 2/16526
See application file for complete search history.

(56) References Cited

U.S. PATENT DOCUMENTS 5,552,811 A * 9/1996 Kurata ................ B41J 2/16552 347/30
2021/0291530 A1 9/2021 Shinomiya et al.

FOREIGN PATENT DOCUMENTS

| | | | |
|---|---|---|---|
| JP | H06-079880 | A | 3/1994 |
| JP | 2020-019217 | A | 2/2020 |
| JP | 2020-023142 | A | 2/2020 |
| JP | 2020-192728 | A | 12/2020 |

* cited by examiner

*Primary Examiner* — Geoffrey S Mruk
(74) *Attorney, Agent, or Firm* — WORKMAN NYDEGGER

(57) ABSTRACT

A cleaning unit is provided with a cleaning member for cleaning an ejecting head for ejecting liquid and a holder detachably mounted in a holding portion disposed at a position faceable with the ejecting head. The cleaning member is held in the holder in a state in which an absorbent body configured to absorb liquid is wrapped around an elastic body.

11 Claims, 7 Drawing Sheets

CLEANING UNIT, LIQUID EJECTING APPARATUS, AND METHOD FOR REPLACING CLEANING UNIT

The present application is based on, and claims priority from JP Application Serial Number 2021-022747, filed Feb. 16, 2021, the disclosure of which is hereby incorporated by reference herein in its entirety.

BACKGROUND

1. Technical Field

The present disclosure relates to a cleaning unit, a liquid ejecting apparatus, and a method for replacing a cleaning unit.

2. Related Art

JP-A-6-79880 discloses an ink jet printer including a print head having an ejection surface, a urethane cleaning member for wiping the ejection surface, and a holder for fixing the cleaning member.

The cleaning member, which directly contacts the print-head, must be precisely aligned during attachment. For this reason, there is a concern that when the cleaning member is replaced, performing the alignment could take time and effort or shift the position of the cleaning member.

SUMMARY

A cleaning unit in accordance with one aspect of the disclosure includes a cleaning member configured to clean an ejecting head configured to eject liquid, and a holder detachably mounted on a holding portion that is disposed at a position faceable with the ejecting head, wherein the cleaning member is held by the holder in a state in which an absorbent body configured to absorb liquid is wrapped around an elastic body.

A liquid ejecting apparatus in accordance with one aspect of the disclosure includes an ejecting head configured to eject liquid, a holding portion disposed at a position faceable with the ejecting head, and the above cleaning unit, wherein the cleaning unit is detachably mounted to the holding portion.

In a method for replacing a cleaning unit in a liquid ejecting apparatus according to an aspect of the present disclosure, wherein the liquid ejecting apparatus includes an ejecting head configured to eject liquid and a holding portion disposed at a position faceable with the ejecting head, and the cleaning unit includes a cleaning member for cleaning the ejecting head and a holder that is detachably mounted to the holding portion and that holds the cleaning member, the exchange method includes moving the ejecting head to a position where the ejecting head does not face the holding portion, removing the cleaning unit from the holding portion, and attaching a replacement cleaning unit to the holding portion.

DESCRIPTION OF EMBODIMENTS

Hereinafter, a cleaning unit 50, a liquid ejecting apparatus 11, a maintenance method of the liquid ejecting apparatus 11, and a method for replacing the cleaning unit 50 according to an embodiment will be described with reference to the drawings. The liquid ejecting apparatus 11 is, for example, an ink jet printer that performs printing on a medium 10. The medium 10 is, for example, a paper sheet.

Overall Configuration of the Liquid Ejecting Apparatus

Figure 1:
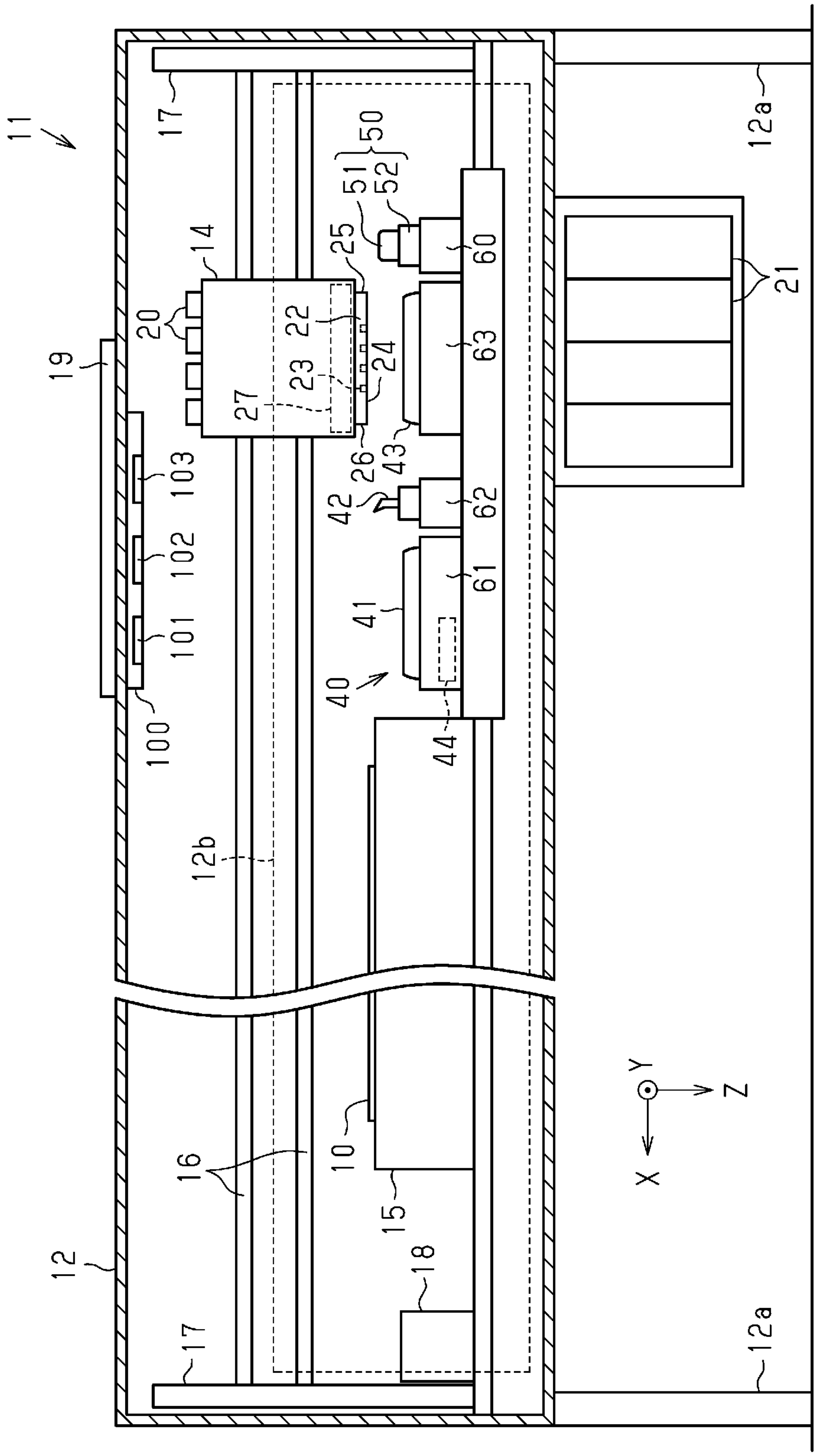
FIG. 1 is a schematic diagram of a liquid ejecting apparatus according to an embodiment.

As shown in FIG. 1, a liquid ejecting apparatus 11 includes an exterior case 12, one or more ejecting heads 22 that discharge liquid, and a maintenance apparatus 40. When the liquid ejecting apparatus 11 includes a plurality of ejecting heads 22, the liquid ejecting apparatus 11 includes a plurality of maintenance apparatuses 40 so as to individually correspond to the plurality of ejecting heads 22.

The liquid ejecting apparatus 11 may include one or more support legs 12*a* that support the exterior case 12. The exterior case 12 may have an opening/closing portion 12*b* that allows access to the inside of the exterior case 12. A user can open the opening/closing portion 12*b* to perform maintenance in the liquid ejecting apparatus 11 such as clearing a jam of the medium 10 or taking care of the maintenance apparatus 40.

The liquid ejecting apparatus 11 may include a carriage 14 for holding the ejecting head 22 and a support base 15 for supporting the medium 10. The medium 10 is transported onto the support base 15 by a transport apparatus (not shown), and is then discharged from the support base 15 to outside the exterior case 12.

The liquid ejecting apparatus 11 may include one or more guide shafts 16, a support mechanism 17 that supports the guide shafts 16, and a drive mechanism 18. The support mechanism 17 may support the guide shafts 16 so they are movable up and down. The carriage 14 moves reciprocally along the guide shafts 16 by drive of the drive mechanism 18.

In the present embodiment, the carriage 14 moves along a scanning direction which is along an X-axis. The medium 10 is transported in a transport direction which is along a Y-axis. The X-, Y-, and Z-axes intersect (for example, are orthogonal to) each other. The direction along the Z axis may be, for example, a vertical direction, or may be a direction in which the ejecting head 22 ejects liquid.

The liquid ejecting apparatus 11 may include an operation panel 19 and a controller 100. The operation panel 19 includes, for example, a touch panel type display, keys, buttons, or switches. The controller 100 can acquire operation contents from a user via the operation panel 19. The controller 100 can display various kinds of information on a display of the operation panel 19.

The carriage 14 holds one or more liquid containers 20. The liquid containers 20 are, for example, tanks, cartridges, or packs that contain liquid. The liquid containers 20 may be detachably mounted to the carriage 14. The plurality of liquid containers 20 may contain different kinds of liquids, for example, inks of different colors. Liquid may be supplied to the liquid containers 20 from other liquid containers 21 through a supply tube (not shown). The other liquid containers 21 are disposed inside or outside the exterior case 12.

The ejecting head 22 includes one or more nozzles 23 that are discharge ports for liquid, and an ejection surface 24 in which the nozzles 23 are opened. The ejecting head 22 may have two side surfaces 25 and 26 intersecting with the X-axis. The side surfaces 25 and 26 are surfaces intersecting with the X-axis. The liquid ejecting apparatus 11 may include a pressurizing mechanism (not illustrated) that pressurizes the liquid in the ejecting head 22. The carriage 14 may include a movement mechanism 27 that moves the ejecting head 22 along the Y-axis, that is, the transport direction.

Maintenance Apparatus

The maintenance apparatus 40 is configured to perform various kinds of maintenance operations. The maintenance apparatus 40 is disposed between one side wall (the right side in FIG. 1) of the exterior case 12 and the support base 15. The maintenance apparatus 40 includes a cleaning unit 50 and a holding portion 60 that holds the cleaning unit 50.

The cleaning unit 50 is provided with a cleaning member 51 for cleaning the ejecting head 22, and a holder 52 detachably mounted in the holding portion 60. The holding portion 60 is disposed at a position faceable with the ejecting head 22, particularly by the ejection surface 24. For example, the holding portion 60 is disposed so as to overlap in plan view with the movement path of the carriage 14 along the X axis.

The maintenance apparatus 40 may further include at least one of a suction cap 41, a wiper 42, or a moisture retaining cap 43. The wiper 42 is, for example, a plate-shaped elastic body. The maintenance apparatus 40 includes a suction pump 44 together with the suction cap 41. The cleaning unit 50, the moisture retaining cap 43, the wiper 42, the suction cap 41, and the support base 15 may be arranged in this order along the scanning direction.

The maintenance apparatus 40 may include first, second and third vertical movers 61, 62, and 63 that respectively move the suction cap 41, the wiper 42, and the moisture retaining cap 43 up and down. The vertical movers 61, 62, 63 are, for example, driven by driving force of a solenoid or a motor, or the urging force of an elastic member, such as a spring. The third vertical mover 63 may raise and lower the cleaning unit 50 together with the moisture retaining cap 43.

The position of the carriage 14 when the ejection surface 24 faces the suction cap 41 is the cleaning position. When the carriage 14 is at the cleaning position and the suction cap 41 is raised by drive of the first vertical mover 61, the suction cap 41 contacts the ejection surface 24 so as to surround the nozzles 23. When the suction pump 44 is driven in this state, the liquid in the ejecting head 25 is discharged into the suction cap 41 through the nozzles 23. This maintenance operation is referred to as suction cleaning. When the pressurizing mechanism (not illustrated) is driven, the liquid is discharged from the nozzles 23. This maintenance operation is referred to as pressurized cleaning.

In the cleaning position, a maintenance operation for discharging liquid from the ejecting head 22 toward the inside of the cap 43 is referred to as flushing. In order to prevent or correct clogging of the nozzles 23, the liquid ejecting apparatus 11 performs cleaning and flushing to discharge air bubbles or foreign substances contained in the liquid.

The position of the carriage 14 when the ejection surface 24 faces the moisture retaining cap 43 is the home position. When the moisture retaining cap 43 is raised by drive of the third vertical mover 63 while the carriage 14 is at the home position, the moisture retaining cap 43 comes into contact with the ejection surface 24 so as to surround the nozzles 23. This is called capping. When the liquid ejecting apparatus 11 is paused or stopped, capping is performed in order to suppress drying of the nozzles 23.

By drive of the second vertical mover 62, the wiper 42 moves between a wiping position where the wiper 42 can contact the ejection surface 24 and a retracted position where the wiper 42 does not contact the ejection surface 24. When the carriage 14 moves from the cleaning position toward the home position while the wiper 42 is at the wiping position, the wiper 42 wipes the ejection surface 24. This maintenance operation is referred to as wiping.

Control Configuration

The controller 100 may include processing circuitry 101, a memory 102, and a communication unit 103. The memory 102 includes, for example, RAM and a nonvolatile memory such as ROM. The memory 102 stores various programs and information, for example, various threshold values, used when executing programs. Various removable memories may be mounted to the liquid ejecting apparatus 11.

The processing circuitry 101 is configured to perform software processing according to the present disclosure. The processing circuitry 101 may include a dedicated hardware circuit (for example, an ASIC or the like) that processes at least a part of the software processing. That is, the software processing may be executed by processing circuitry including at least one of: one or a plurality of software processing circuitries, or one or a plurality of dedicated hardware circuits. The communication unit 103 may include various removable memories and communication interface circuitry. The communication interface circuitry is configured to communicate in accordance with various communication protocols with other devices connected by wired or wireless connection to the liquid ejecting apparatus 11. The processing circuitry 101 can acquire a print job, which is data for printing, from another apparatus (for example, a computer of a user) via the communication unit 103. The processing circuitry 101 causes execution of a liquid ejection operation and various maintenance operations based on a program stored in the memory 102.

The processing circuitry 101 performs a liquid discharge operation based on an instruction input through the operation panel 19, for example. More specifically, liquid droplets are discharged from the ejecting head 22 while the carriage 14 is reciprocated with respect to the medium 10 transported on the support base 15. Accordingly, when the liquid ejecting apparatus 11 is a printer, printing is performed. A region on the support base 15 where droplets are ejected for printing is referred to as a printing region.

For example, the processing circuitry 101 causes a series of maintenance operations including suction cleaning to be performed every time a certain period of time (for example, one hour) elapses after liquid ejection (printing operation). In addition, the processing circuitry 101 may also perform a series of maintenance operations before the liquid ejecting apparatus 11 is paused or stopped after the end of liquid discharge.

The series of maintenance operations includes, for example, suction cleaning, wiping, flushing, and cleaning. Cleaning is a maintenance operation by the cleaning unit 50 of removing liquid and foreign matter clinging to the ejecting head 22. The contents of the series of maintenance operations can be changed in accordance with user instructions or a program. Each maintenance operation may be performed individually in accordance with user instructions or a program.

After suction cleaning, liquid droplets may cling to the ejection surface 24. Therefore, the processing circuitry 101 may perform wiping after suction cleaning. By wiping, droplets and foreign matter (e.g. paper dust) clinging to the ejection surface 24 are wiped off from the vicinity of the nozzles 23. Sometimes the liquid, including foreign matter, that was wiped off by the wiping operation may remain in the vicinity of the side surfaces 25 and 26.

Sometimes after wiping, the menisci in the nozzles 23 may be disturbed. For this reason, flushing, in which liquid droplets are discharged from the nozzles 23, may be performed after wiping. Further, after wiping or flushing, the processing circuitry 101 may use the cleaning unit 50 to perform cleaning of the ejecting head 22. When cleaning is performed after wiping, the cleaning may be performed while avoiding the vicinity of the nozzles 23. This is because liquid and foreign matter in the vicinity of the nozzles 23 are removed by wiping.

Cleaning Unit

Figure 2:
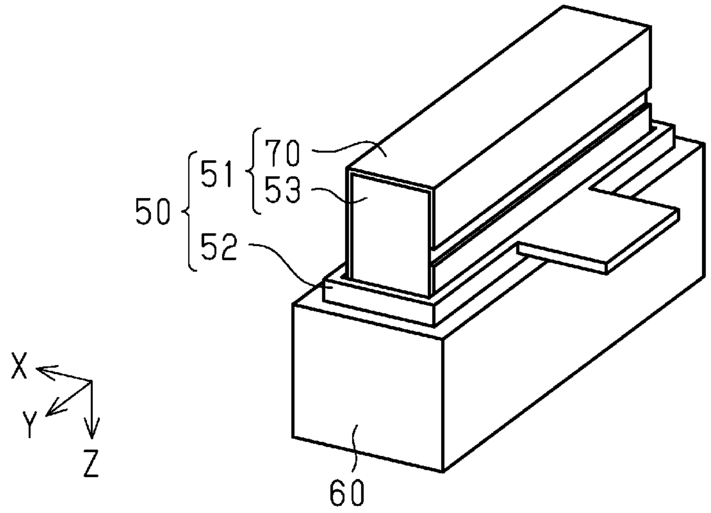
FIG. 2 is a perspective view of a cleaning unit and a holding portion according to the embodiment.

As shown in FIG. 2, the cleaning member 51 may have an elastic body 53 and an absorbent body 70 capable of absorbing liquid. The elastic body 53 may be, for example, urethane foam or rubber sponge of silicon rubber, or may be flexible solid rubber (for example, silicon rubber). The cleaning member 51 may be detachably mounted to the holder 52. For example, the cleaning member 51 is held by the holder 52 in a state in which the sheet-like absorbent body 70 is wrapped around the elastic body 53.

Figure 3:
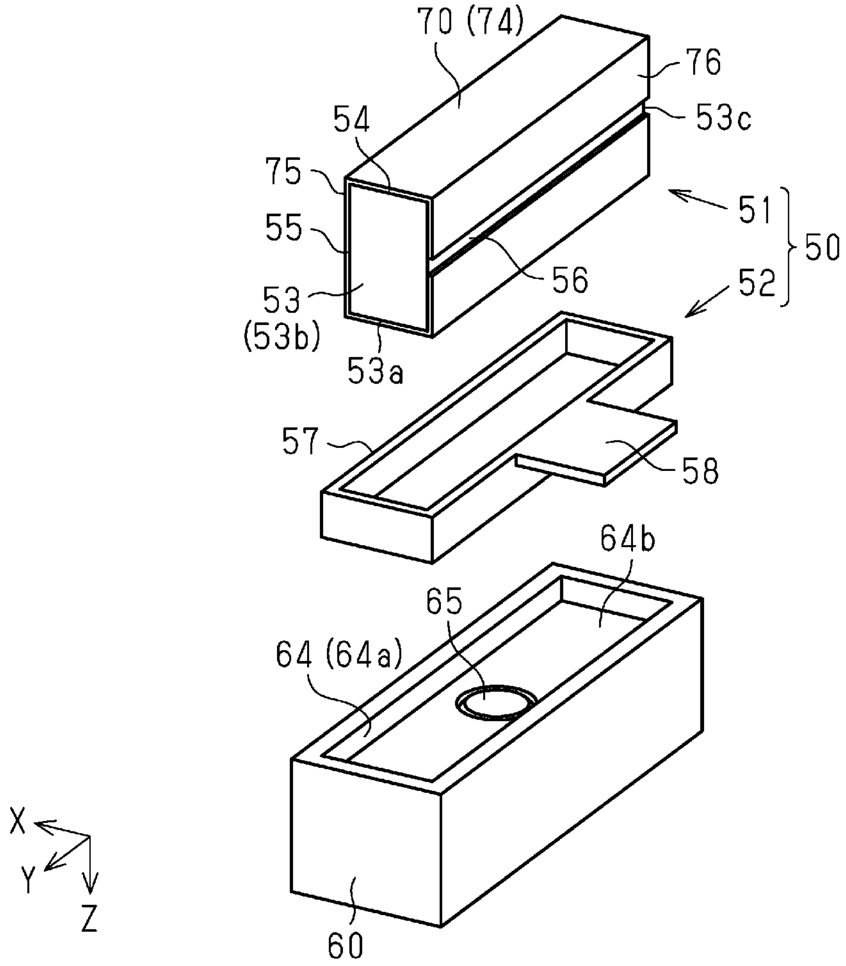
FIG. 3 is an exploded perspective view of the cleaning unit and the holding portion of FIG. 2.

As shown in FIG. 3, the holding portion 60 may have a mounting recess 64 in which the holder 52 is mounted. The mounting recess 64 has four inner wall surfaces 64*a* extending in the mounting direction of the holder 52. Therefore, the holder 52 is guided by the inner wall surface 64*a* and is easily mounted in the holding portion 60.

At least one of the holding portion 60 or the holder 52 (both the holding portion 60 and the holder 52 in the present embodiment) is made of metal, for example, iron or aluminum. At least the other of the holding portion 60 or the holder 52 may have a magnet 65. In one example, the holding portion 60 includes a magnet 65 embedded in an inner bottom surface 64*b* of the mounting recess 64.

At least a part of the sheet-like absorbent body 70 may be adhered to the elastic body 53. That is, the cleaning member 51 may include the absorbent body 70, at least a part of which is adhered to the elastic body 53, and the cleaning member 51 may be detachably mounted to the holder 52. Adhering includes, for example, adhering by double-sided tape, by adhesive, or by welding. A part of the absorbent body 70, for example, only both ends of the absorbent body 70, may be adhered to the elastic body 53, or the entirety of the absorbent body 70 may be adhered to the elastic body 53.

The absorbent body 70 is, for example, cloth or paper having an excellent cleaning property or absorbency. Fabric may be a non-woven or woven fabric, for example a woven fabric of polyester, nylon, or cotton. The absorbent body 70 may be a thick woven fabric made of ultrafine fibers, such as Toraysee™.

The elastic body 53 may be, for example, a rectangular parallelepiped and may have a top surface 54, a first surface 55 that intersects (is orthogonal to) the top surface 54, and a second surface 56 on an opposite side from the first surface 55. When the cleaning member 51 is mounted in the holder 52, the top surface 54 is disposed at a position separated from the holder 52.

The absorbent body 70 may be wrapped around the elastic body 53 so as to cover at least the top surface 54, the first surface 55, and the second surface 56. In one example, the absorbent body 70 is also wrapped around the bottom surface 53*a*, which is on the opposite side from the top surface 54, in addition to the surfaces 54, 55, and 56. Both ends of the absorbent body 70 may be adhered to the second surface 56 so as not to overlap each other. The front surface 53*b* and the back surface 53*c* (two surfaces intersecting the Y-axis) of the elastic body 53 may be exposed without being covered by the absorbent body 70. Of the outer surface of the absorbent body 70 wrapped around the elastic body 53, regions that overlap with the top surface 54, the first surface 55, and the second surface 56 are a top cleaning surface 74, a first cleaning surface 75, and a second cleaning surface 76, respectively.

The holder 52 may include a box-like accommodation portion 57 that accommodates the cleaning member 51 and a gripping portion 58 that protrudes from the accommodation portion 57. The gripping portion 58 may protrude from a side surface that extends in the longitudinal direction of the holder 52. When the user replaces the cleaning member 51, the user can grip the gripping portion 58.

Cleaning the Ejecting Head Using the Cleaning Unit

Figure 4:
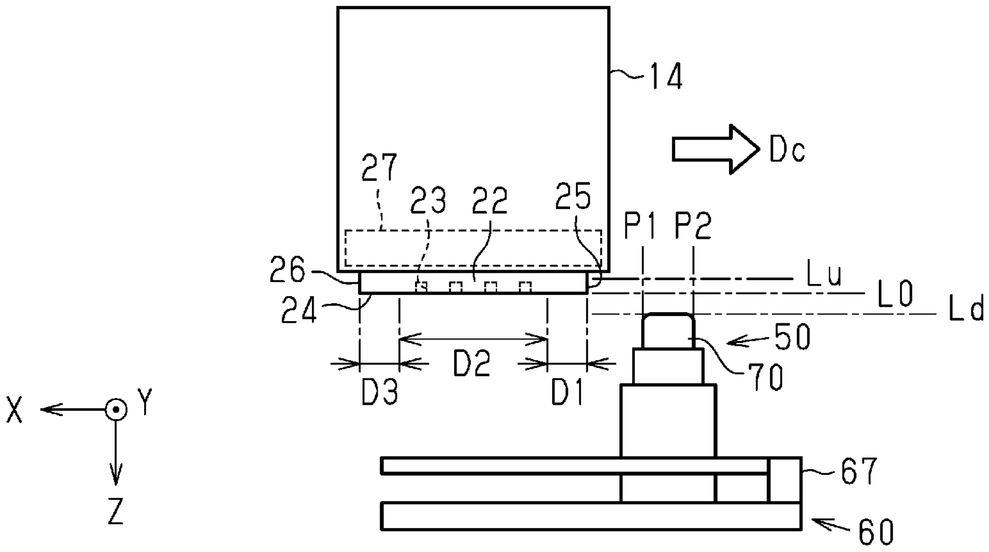
FIG. 4 is a diagram illustrating cleaning by the cleaning unit of FIG. 2.

As shown in FIG. 4, the holding portion 60 may include a vertical mover 67 configured to raise and lower the cleaning unit 50. The vertical mover 67 raises and lowers the cleaning unit 50 by, for example, the drive force of a solenoid or a motor, or by the urging force of an elastic member such as a spring.

The vertical mover 67 changes the height of the top cleaning surface 74 to a reference level L0, a raised level Lu, or a lowered level Ld by raising and lowering the cleaning unit 50. The raised level Lu is higher than the reference level L0, and the reference level L0 is higher than the lowered level Ld. The reference level L0 is a height when the ejection surface 24 is cleaned by the top cleaning surface 74. The raised level Lu is the height at which the cleaning surfaces 75, 76 clean the side surfaces 25, 26, respectively. The lowered level Ld is a height at which the top cleaning surface 74 does not touch the ejecting head 22.

The ejecting head 22 is configured to be movable in the scanning direction relative to the cleaning member 51 along with the movement of the carriage 14. A movement direction Dc of the ejecting head 22 during cleaning is indicated by a black-outlined arrow in FIG. 4. A first cleaning position P1 and a second cleaning position P2 are positions in the movement direction Dc. When the height of the top cleaning surface 74 is at the raised level Lu, the first side surface 25 at the first cleaning position P1 contacts the first cleaning surface 75. Similarly, when the height of the top cleaning surface 74 is at the raised level Lu, the second side surface 26 at the second cleaning position P2 contacts the second cleaning surface 76.

At least one of the ejecting head 22 or the holding portion 60 may be configured to be movable along a direction (transport direction) intersecting with the scanning direction. In one example, the ejecting head 22 is configured to reciprocate along the Y-axis by drive of the movement mechanism 27. The reciprocating movement of the ejecting head 22 or the holding portion 60 in a state in which the cleaning member 51 is in contact with the ejecting head 22 is referred to as reciprocal wiping. By reciprocal wiping, the ejecting head 22 can be rubbed by the absorbent body 70. When cleaning is performed after wiping, the cleaning distances of the ejection surface 24 along the movement direction Dc are a first distance D1 and a third distance D3. The first distance D1 may be equal to the third distance D3. A second distance D2 is a length along the movement direction Dc in a region including the nozzles 23. The region including the nozzles 23 and its periphery is referred to as a nozzle region. The second distance D2 may be longer than either the first distance D1 or the third distance D3.

When the distances D1, D2, D3 are added, the length of the ejection surface 24 along the movement direction Dc is obtained. In the ejection surface 24, the range from the first side surface 25 by the first distance D1 is referred to as a first end region (the right end region in FIG. 4), and the range from the second side surface 26 by the third distance D3 is referred to as a second end region (the left end region in FIG. 4). Each of the distances D1, D3 may be shorter than the length of the top cleaning surface 74 in the movement direction Dc. In this case, even if the ejecting head 22 does not move in the movement direction Dc, each of the first and second end regions can be reciprocally wiped by the cleaning member 51.

Cleaning Process

Figure 5:
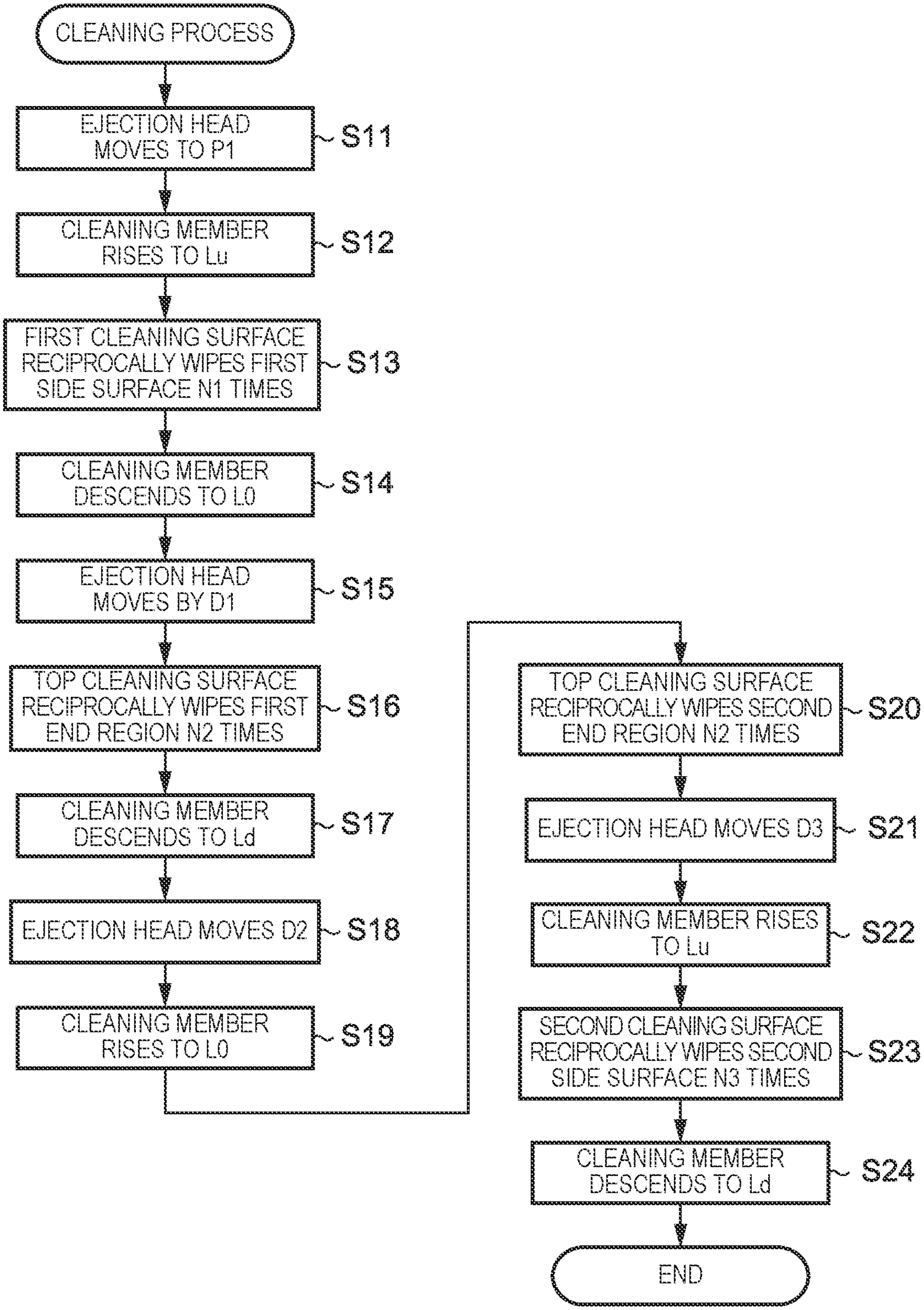
FIG. 5 is a flowchart of a cleaning process performed by using the cleaning unit of FIG. 2.

FIG. 5 shows a flow of the cleaning process of the ejecting head 22. Operations related to the cleaning process are executed by the various mechanisms or devices described above based on the control of the processing circuitry 101.

First, in step S11, the ejecting head 22 moves in the movement direction Dc until the first side surface 25 reaches the first cleaning position P1.

Figure 6:
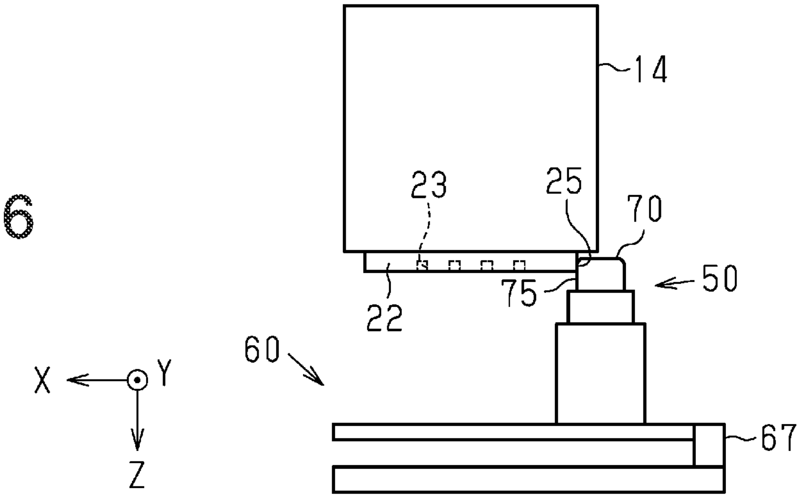
FIG. 6 is a view illustrating a state in which the cleaning unit of FIG. 4 is in contact with a first side surface of an ejecting head.

In step S12, as shown in FIG. 6, the cleaning member 51 rises to the raised level Lu. As a result, the first cleaning surface 75 contacts the first side surface 25. In the subsequent step S13, the first cleaning surface 75 reciprocally wipes the first side surface 25 N1 times (for example, two times). Steps S12 and S13 clean the first side surface 25.

Figure 7:
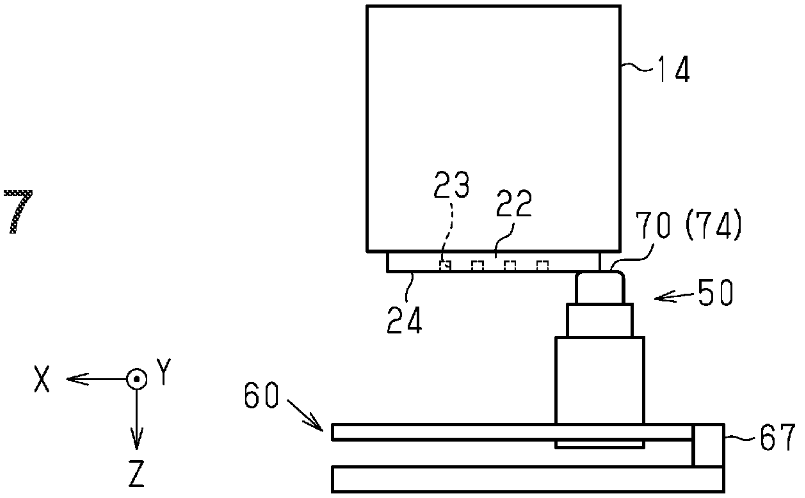
FIG. 7 is a view showing a state in which the cleaning unit of FIG. 6 is in contact with an ejection surface of the ejecting head.

In step S14, the cleaning member 51 descends to the reference level L0. In step S15, as shown in FIG. 7, the ejecting head 22 moves in the movement direction Dc by the first distance D1. During this movement, the top cleaning surface 74 is in contact with the ejection surface 24. In a subsequent step S16, the top cleaning surface 74 reciprocally wipes the first end region of the ejection surface 24 N2 times (for example, five times). Steps S15 and S16 clean the first end region.

In step S17, the cleaning member 51 descends to the lowered level Ld. As a result, the cleaning member 51 is separated from the ejecting head 22. In step S18, the ejecting head 22 moves in the movement direction Dc by the second distance D2. Accordingly, the cleaning member 51 passes over the nozzle region without cleaning the nozzle region.

In step S19, the cleaning member 51 rises to the reference level L0. This causes the top cleaning surface 74 to contact the second end region of the ejection surface 24. In a subsequent step S20, the top cleaning surface 74 reciprocally wipes the second end region N2 times (for example, five times). The number of times that the second end region is reciprocally wiped may be different from the number of times that the first end region is reciprocally wiped. Steps S19 and S20 clean the second end region of the ejection surface 24.

Figure 8:
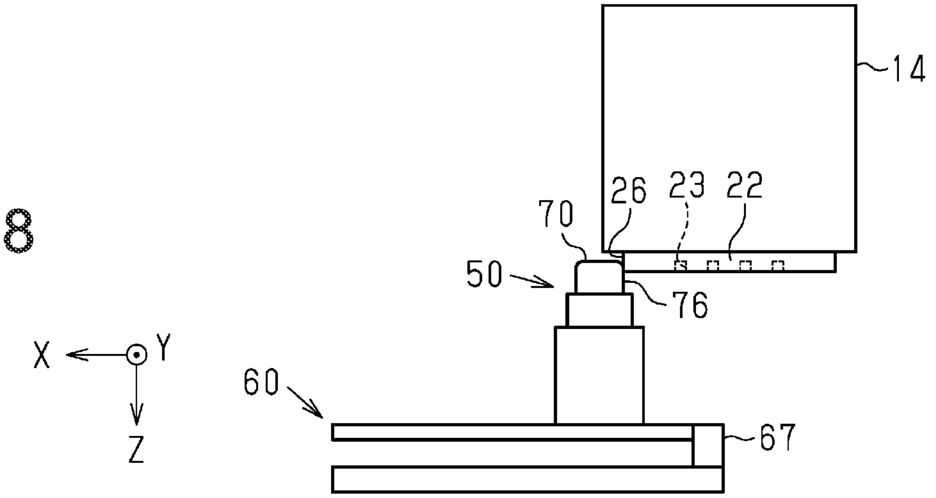
FIG. 8 is a view showing a state in which the cleaning unit of FIG. 7 is in contact with a second side surface of the ejecting head.

In step S21, the ejecting head 22 moves in the movement direction Dc by the third distance D3. As a result, the second side surface 26 reaches the second cleaning position P2. In step S22, as shown in FIG. 8, the cleaning member 51 rises to the raised level Lu. As a result, the second cleaning surface 76 is brought into contact with the second side surface 26.

In step S23, the second cleaning surface 76 reciprocally wipes the second side surface 26 N3 times (for example, two times). Steps S22 and S23 clean the second side surface 26. The number of times N2 of reciprocally wiping the ejection surface 24 may be greater than the number of times N1, N3 of reciprocally wiping the side surfaces 25 and 26. The number of times N3 may be the same as or different from the number of times N1. In step S24, the cleaning member 51 descends to the lowered level Ld. As a result, the cleaning member 51 is separated from the ejecting head 22, and the cleaning process ends.

When a liquid ejection process (printing process) is scheduled after the cleaning process, the ejecting head 22 moves to the printing area. When no printing process is planned after the cleaning process, the ejecting head 22 moves to the home position and capping is performed. Performing capping after the ejecting head 22 is cleaned suppresses solidification of the liquid attached to the ejecting head 22 while the liquid ejecting apparatus 11 is stopped.

The operation of the cleaning unit 50 of the present embodiment will be described.

Replacement of Cleaning Unit

The user can replace the cleaning unit 50 when the absorbent body 70 becomes dirty. When replacing the cleaning unit 50, first, under the control of the processing circuitry 101, the ejecting head 22 is moved to a position where the ejecting head does not face the holding portion 60. Before, after, or simultaneously with this movement, the user opens the opening/closing portion 12*b*. The opening/closing portion 12*b* may be arranged at any position of the exterior case 12, but the gripping portion 58 is preferably arranged near the opening/closing portion 12*b*.

Subsequently, the user detaches the cleaning unit 50 from the holding portion 60. At this time, the user grips the gripping portion 58 and removes the cleaning member 51 together with the holder 52. Next, the user attaches the replacement cleaning unit 50 in the holding portion 60. Thus, replacement of the cleaning unit 50 is completed.

In preparation for such replacement, the user may prepare a plurality of new cleaning units 50 in advance. In this case, since the time required for replacement is shortened, it is possible to improve productivity by shortening the time that the ejection process is interrupted.

Replacement of the Cleaning Member

The cleaning unit 50 includes the cleaning member 51 in which the absorbent body 70 is integrated with the elastic body 53. Therefore, the cleaning member 51 can be replaced simply by taking out the cleaning member 51 from the holder 52 and then attaching a new cleaning member 51.

In the case where the ejecting head 22 is cleaned by using a roll sheet that is an absorbent body, it is necessary to provide a mechanism for unwinding or feeding the replacement roll sheet. Therefore, the size of the apparatus for cleaning is increased. On the other hand, since the cleaning unit 50 does not include a replacement absorbent body 70, its size is small. Further, since the size of the cleaning unit 50 is small and the number of constituent elements is small, even if, for example, tolerance causes a misalignment, the influence is small.

According to this embodiment, the following effects can be achieved.

(1) The attachment of the cleaning unit 50 to the liquid ejecting apparatus 11 is completed simply by holding the gripping portion 58 and fitting the holder 52 into the holding portion 60. Therefore, a user can easily replace the cleaning unit 50 without directly touching the dirty cleaning member 51 and without taking time and effort for positioning.

(2) When the cleaning member 51 comes into contact with the ejecting head 22, the elastic body 53 serves as a cushion, and thus an excessive load is not applied to the ejecting head 22. Therefore, the ejecting head 22 is less likely to be damaged.

(3) The sheet-shaped absorbent body 70 is wrapped around the elastic body 53. Therefore, it is possible to bring the absorbent body 70 into surface contact with the ejecting head 22 while suppressing bending of the absorbent body 70.

(4) The elastic body 53 has two surfaces (a front surface 53*b* and a back surface 53*c*) on which the absorbent body 70 is not wrapped. Therefore, by pinching the two surfaces, the user can remove the cleaning member 51 from the holder 52 without touching the soiled absorbent body 70.

(5) Since the cleaning member 51 has three surfaces (the top cleaning surface 74, the first cleaning surface 75, and the second cleaning surface 76), the ejection surface 24 and the side surfaces 25, 26 can be cleaned by different surfaces, respectively. Therefore, dirt removed from one surface does not adhere to another surface.

(6) The absorbent body 70 can absorb the liquid adhering to the ejecting head 22. Further, by reciprocally wiping the ejecting head 22, foreign matter fixed to the ejecting head 22 can also be removed.

(7) Since the holder 52 is attracted to the holding portion 60 by magnetic force, the holder 52 can be attached to and detached from the holding portion 60 with a simple configuration. Further, the user can perceive the completion of mounting in the holder 52 by a click sound from the metal attracted by the magnetic force hitting against the magnet 65.

The above embodiment may be modified as in the following modifications. Further, the configurations included in these embodiments and the configurations included in the following modifications may be arbitrarily combined, or the configurations included in the following modifications may be arbitrarily combined together.

First Modification

Figure 9:
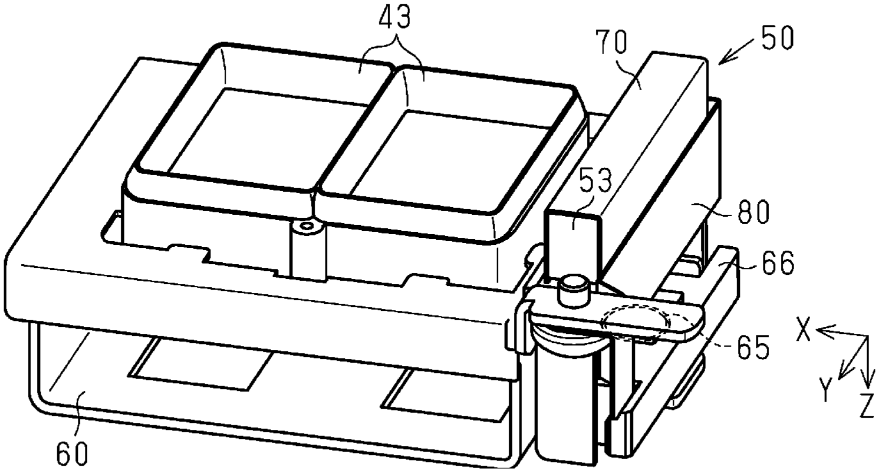
FIG. 9 is a perspective view showing a cleaning unit and a holding portion according to a first modification.
Figure 10:
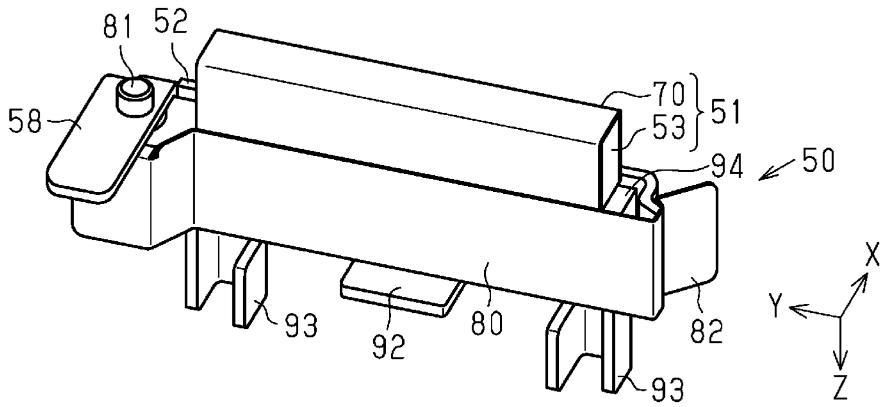
FIG. 10 is a perspective view showing the cleaning unit of FIG. 9.
Figure 11:
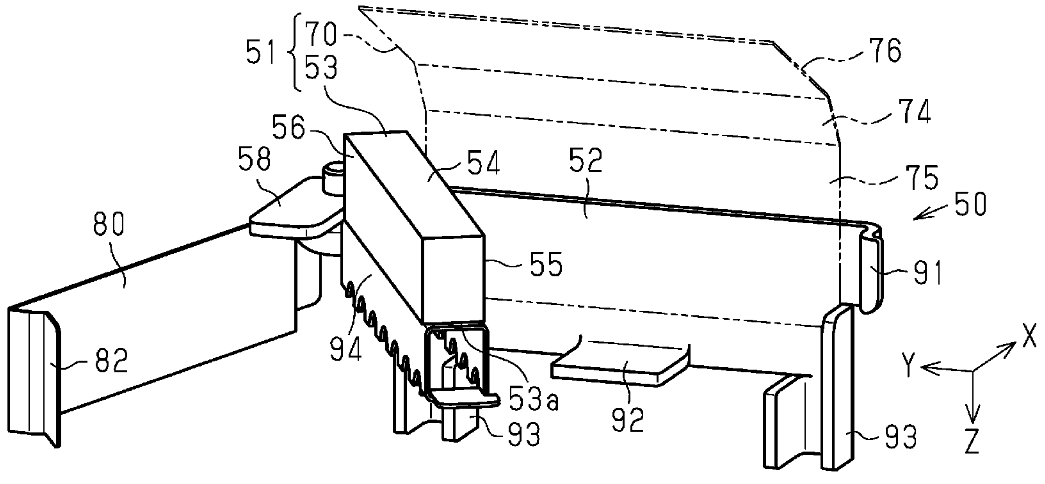
FIG. 11 is a perspective view showing a state in which an absorbent body is removed from the cleaning unit of FIG. 10.

As in a first modification illustrated in FIGS. 9 to 11, the holding portion 60 may hold one or more moisture retaining caps 43 in addition to the cleaning unit 50. In this case, either the third vertical mover 63 or the vertical mover 67 may not be provided. The holding portion 60 may have a mounting plate 66 in which the magnet 65 is embedded at a position where the cleaning unit 50 is mounted. The holding portion 60 may be made of metal.

As shown in FIG. 10, the holder 52 may further include a holding member 80 configured to hold the absorbent body 70 wrapped around the elastic body 53. Both the holder 52 and the holding member 80 are plate-shaped, and are configured to sandwich the cleaning member 51 therebetween. In this case, the absorbent body 70 may not be adhered to the elastic body 53.

The holding member 80 may be attached to the holder 52 so as to be pivotable about a pivot shaft 81. The holder 52 may have a gripping portion 58 protruding from one end in the longitudinal direction. The holding member 80 may have an engagement portion 82 engageable with the holder 52.

As shown in FIG. 11, the holder 52 may have a receiving portion 91 that engages with the engagement portion 82. The holder 52 may have a metal plate 92 disposed so as to face the magnet 65 when the holder 52 is mounted on the holding portion 60. The holder 52 may be entirely made of metal. The holder 52 may have one or more (e.g., two) legs 93 that engage the mounting plate 66. Each of the leg portions 93 and the mounting plate 66 has a surface extending in the mounting direction of the holder 52.

The holder 52 may include a pivot member 94 to which the elastic body 53 is fixed. The bottom surface 53*a* of the elastic body 53 may be fixed to the pivot member 94. The elastic body 53 and the pivot member 94 are arranged in this order along the Z axis. In this case, the absorbent body 70 may be wrapped around the elastic body 53 so as to cover the three surfaces of the top surface 54, the first surface 55, and the second surface 56.

The pivot member 94 may be separate from the holder 52 and may be pivotable about the pivot shaft 81. The elastic body and the pivot member 94 integrated with each other may be configured to be sandwiched between the holding member 80 and the holder 52.

When the holding member 80 is pivoted open, the absorbent body 70 can be attached to and removed from the elastic body 53. At this time, when the pivot member 94 is also pivoted, the surfaces 55 and 56 are separated from the holder 52 and the holding member 80, respectively. Therefore, the absorbent body 70 is easily attached and detached.

In a state in which the absorbent body 70 is wrapped around the elastic body 53, a portion of the absorbent body 70 flush with the first cleaning surface 75 is sandwiched between the pivot member 94 and the holder 52 and a portion of the absorbent body 70 flush with the second cleaning surface 76 is sandwiched between the pivot member 94 and the holding member 80. Both ends of the absorbent body 70 can be extended along the pivot member 94. Therefore, it is not necessary to strictly set the length of the absorbent body 70 wrapped around the elastic body 53.

If the elastic body 53 is integrated with the holder 52 and only the absorbent body 70 is replaced as in the first modification, the elastic body 53 can be used repeatedly. Therefore, only the absorbent body 70 is waste generated by the replacement. The elastic body 53 may be detachably mounted to the holder 52 alone or together with the pivot member 94. In this case, the absorbent body 70 and the elastic body 53 can be exchanged at different frequencies.

Second Modification

Figure 12:
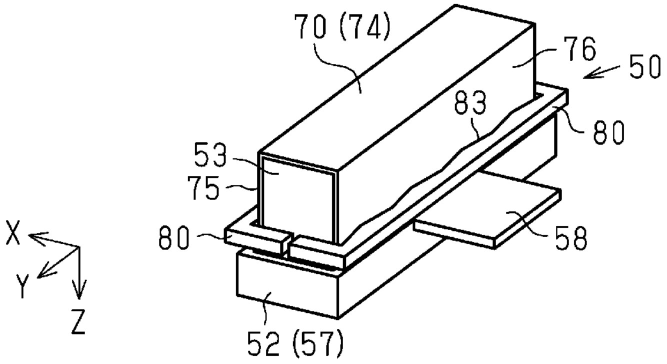
FIG. 12 is a perspective view showing a cleaning unit according to a second modification.
Figure 13:
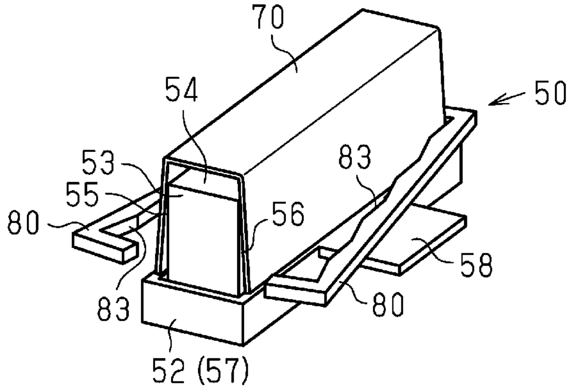
FIG. 13 is a perspective view illustrating removal or attachment of an absorbent body of the cleaning unit of FIG. 12.
Figure 14:
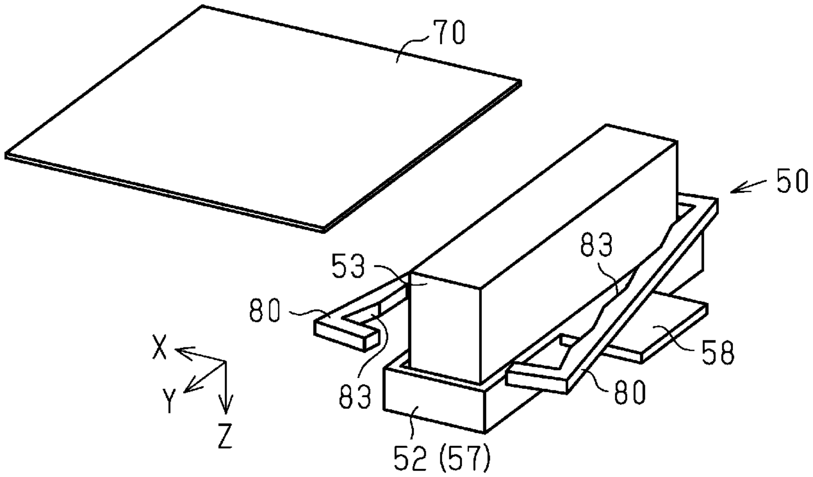
FIG. 14 is a perspective view showing replacement of the absorbent body of FIG. 13.

As in a second modification illustrated in FIGS. 12 to 14, the holder 52 may include a pair of holding members 80 that sandwich the elastic body 53 around which the absorbent body 70 is wrapped. A pivot shaft for pivoting the holding members 80 may be provided at the base ends of the pair of holding members 80. The absorbent body 70 of the second modification may not be adhered to the elastic body 53. The elastic body 53 may or may not be fixed to the holder 52.

As shown in FIGS. 13 and 14, the pair of holding members 80 are opened and closed by moving relative to each other. When the holding members 80 are opened, the absorbent body 70 can be removed from the elastic body 53. After the used absorbent body 70 is removed, a replacement absorbent body 70 is wrapped around the elastic body 53, and the holding members 80 are closed. Thus, replacement of the absorbent body 70 is completed.

The holding members 80 may have knurled slip stoppers 83 at positions facing each other. Slippage of the absorbent body 70 can be suppressed by the slip stoppers 83. The tips of the pair of holding members 80 may be provided with engagement portions that engage with each other.

Other Modifications

The cleaning member 51 may be used to clean the entire ejection surface 24.

The cleaning member 51 may clean at least one amongst the ejection surface 24 and the side surfaces 25 and 26.

The absorbent body 70 may cover at least one surface of the elastic body 53.

The elastic body 53 may be a polyhedron other than a rectangular parallelepiped, or the top surface 54 may be a curved surface.

The elastic body 53 may be fixed to the holder 52, or may be detachably mounted to the holder 52.

The cleaning unit 50 or the cleaning member 51 may have at least one of the elastic body 53 or the absorbent body 70 in a replaceable manner.

The holding portion 60 may include, for example, a recessed portion that accommodates the holder 52 or a mounting portion that engages with the holder 52. According to this configuration, the holder 52 can be easily positioned relative to the holding portion 60. The recess or mounting portion of the holding portion 60 may have a wall surface, a shaft, or a plate extending along the mounting direction of the holder 52. According to this configuration, positioning can be easily performed by guiding the holder 52 along the wall surface, shaft, or plate.

In addition to or instead of the holding portion 60, the holder 52 may include the magnet 65.

The method of holding the holder 52 on the holding portion 60 is not limited to the magnetic force of the magnet 65, and may be, for example, a hook or a hook-and-loop fastener, or suction by a suction mechanism.

The holding member 80 may be separate from the holder 52. For example, the holding member 80 may be a clip that sandwiches the absorbent body 70 wrapped around the elastic body 53. Alternatively, the holding member 80 may be a rigid frame or an elastic ring through which the top surface 54 and the top cleaning surface 74 can pass. Alternatively, the holding member 80 may be a pin that pierces the absorbent body 70 and the elastic body 53.

The liquid ejecting apparatus 11 may be a liquid ejecting apparatus 11 for ejecting a liquid other than ink. The state of the liquid discharged from the liquid ejecting apparatus 11 as small-amount droplets includes a granular state, a teardrop state, and a thread-like state with a tail. The liquid here may be any material that can be ejected from the liquid ejecting apparatus 11. For example, the liquid may be in a state in which the substance is in a liquid phase, and includes fluids such as a liquid body having high or low viscosity, sol, water gel, other inorganic solvents, organic solvents, solutions, liquid resins, liquid metals, and metal melts. The liquid includes not only a liquid as one state of a substance but also a substance obtained by dissolving, dispersing, or mixing in solvent particles of a functional material made of a solid material such as a pigment or metal particles. Typical examples of the liquid include liquid crystal and ink as described in the above embodiments. Here, ink includes general water-based ink, oil-based ink, and various liquid compositions such as gel ink and hot-melt ink. As a specific example of the liquid ejecting apparatus 11, there is an apparatus that discharges a liquid including a material, in a dispersed or dissolved form, such as an electrode material or a color material used for manufacturing a liquid crystal display, an electroluminescence display, a surface light emitting display, a color filter, or the like. The liquid ejecting apparatus 11 may be a device for ejecting a biological organic substance used for manufacturing a biochip, a device used as a precision pipette for ejecting a liquid to be a sample, a textile printing device, a micro dispenser, or the like. The liquid ejecting apparatus 11 may be a device that discharges lubricating oil in a pinpoint manner to a precision machine such as a watch or a camera, or a device that discharges a transparent resin liquid such as an ultraviolet curable resin onto a substrate in order to form an optical lens, a micro-hemispherical lens, or the like used in an optical communication element or the like. The liquid ejecting apparatus 11 may be a device for discharging an etching solution such as an acid or an alkali for etching a substrate or the like.

Hereinafter, technical ideas grasped from the above-described embodiments and modifications and effects thereof will be described.

1) A cleaning unit includes a cleaning member configured to clean an ejecting head configured to eject liquid and holder detachably mounted on a holding portion that is disposed at a position faceable with the ejecting head, wherein the cleaning member is held by the holder in a state in which an absorbent body configured to absorb liquid is wrapped around an elastic body.

With this cleaning unit, the cleaning member can be easily attached to and detached from the holding portion via the holder. Therefore, replacement of the cleaning member does not take time and effort, and an attachment error is less likely to occur.

2) The cleaning unit of 1), wherein the cleaning member includes the absorbent body at least a part of which is adhered to the elastic body, and the cleaning member is detachably mounted to the holder. With this cleaning unit, since the absorbent body is integrated with the elastic body, the cleaning member can be easily attached to and detached from the holder.

Therefore, a new cleaning unit for replacement can be easily prepared.

3) The cleaning unit according to 1), wherein the holder includes a holding member configured to hold the absorbent body wrapped around the elastic body.

With this cleaning unit, since replacement of only the absorbent body is possible, the elastic body can be repeatedly used. Therefore, it is possible to reduce the amount of waste generated by the replacement.

4) The cleaning unit according to any one of 1) to 3), wherein at least one of the holding portion or the holder is made of metal, and at least the other of the holding portion or the holder includes a magnet.

With this cleaning unit, the holder can be attached to and detached from the holding portion by the magnetic force of the magnet. Further, since positioning can be easily performed by magnetic force, cleaning can be stably performed.

5) The cleaning unit according to any one of 1) to 4), wherein the holder includes an accommodation portion configured to accommodate the cleaning member and gripping portion protruding from the accommodation portion.

With this cleaning unit, the user can easily attach and detach the cleaning unit to and from the holding portion by grasping the gripping portion. Further, since the cleaning unit can be replaced without touching the cleaning member, the user's hands do not get dirty.

6) The cleaning unit according to any one of 1) to 5), wherein the elastic body is a rectangular parallelepiped and includes a top surface, a first surface intersecting the top surface, and a second surface on an opposite side from the first surface, wherein the absorbent body is wrapped around the elastic body so as to cover at least the top surface, the first surface, and the second surface. With this cleaning unit, the ejection surface and the two side surfaces of the ejecting head can be cleaned by the portions of the absorbent body that cover the top surface, the first surface, and the second surface. Since it is not necessary to change the direction of the cleaning member in order to clean different surfaces of the ejecting head, the configuration of the liquid ejecting apparatus can be simplified.

7) A cleaning unit for a liquid ejecting apparatus, the liquid ejecting apparatus including an ejecting head configured to eject liquid and a holding portion disposed at a position faceable with the ejecting head, wherein the cleaning unit includes a holder which is detachably mounted to the holding portion, a cleaning member for cleaning the ejecting head is detachably mounted to the holder, and the cleaning member includes an elastic body and an absorbent body which is wrapped around the elastic body and can absorb liquid.

With this cleaning unit, the cleaning member can be easily attached to and detached from the holding portion via the holder. Therefore, replacement of the cleaning member does not take time and effort, and an attachment error is less likely to occur.

8) A liquid ejecting apparatus including an ejecting head configured to eject liquid, a holding portion disposed at a position faceable with the ejecting head, and the cleaning unit according to any one of 1) to 7) detachably mounted to the holding portion.

With this liquid ejecting apparatus, the ejecting head can be cleaned by mounting the cleaning unit in the holding portion. Further, since the cleaning unit is detachable from the holding portion, the cleaning unit can be replaced.

9) The liquid ejecting apparatus according to 8), configured such that the ejecting head moves relative to the holding portion along a scanning direction, and further including a movement mechanism configured to move at least one of the ejecting head or the holding portion in a direction intersecting the scanning direction.

With this liquid ejecting apparatus, the absorbent body can be brought into contact with the ejecting head by moving the ejecting head in the scanning direction. Further, in a state in which the ejecting head is in contact with the absorbent body, the ejecting head can be rubbed by the absorbent body by moving the ejecting head and the holding portion relative to each other in the direction intersecting with the scanning direction. This makes it possible to more effectively clean the ejecting head.

10) A method for replacing a cleaning unit in a liquid ejecting apparatus, the liquid ejecting apparatus including an ejecting head configured to eject liquid and a holding portion disposed at a position faceable with the ejecting head, the cleaning unit including a cleaning member that cleans the ejecting head and a holder that is detachably mounted to the holding portion and that holds the cleaning member, the method for replacing including moving the ejecting head to a position where the ejecting head does not face the holding portion, removing the cleaning unit from the holding portion, and attaching a replacement cleaning unit to the holding portion.

With this method, the used cleaning member can be removed by detaching the cleaning unit from the holding portion. Further, a new cleaning member can be replaced by attaching a replacement cleaning unit to the holding portion.

What is claimed is:

1. A cleaning unit comprising:

a cleaning member configured to clean an ejecting head configured to eject liquid; and a holder detachably mounted on a holding portion that is disposed at a position faceable with the ejecting head, wherein the cleaning member is held by the holder in a state in which an absorbent body configured to absorb liquid is wrapped around an elastic body, and wherein the holder is detachable from the holding portion while holding the cleaning member.

2. The cleaning unit according to claim 1, wherein:

the cleaning member includes the absorbent body at least a part of which is adhered to the elastic body, and the cleaning member is detachably mounted to the holder.

3. The cleaning unit according to claim 1, wherein:

the holder includes a holding member configured to hold the absorbent body wrapped around the elastic body.

4. The cleaning unit according to claim 1, wherein:

at least one of the holding portion or the holder is made of metal, and at least the other of the holding portion or the holder includes a magnet.

5. The cleaning unit according to claim 1, wherein the holder includes:

an accommodation portion configured to accommodate the cleaning member and a gripping portion protruding from the accommodation portion.

6. The cleaning unit according to claim 1, wherein:

the elastic body is a rectangular parallelepiped and includes:

a top surface;

a first surface intersecting the top surface; and a second surface on an opposite side from the first surface, wherein the absorbent body is wrapped around the elastic body so as to cover at least the top surface, the first surface, and the second surface.

7. A liquid ejecting apparatus comprising:

an ejecting head configured to eject liquid;

a holding portion disposed at a position faceable with the ejecting head; and the cleaning unit according to claim 1, wherein the cleaning unit is detachably mounted to the holding portion.

8. The liquid ejecting apparatus according to claim 7, configured such that the ejecting head moves relative to the holding portion along a scanning direction, and further comprising:

a movement mechanism configured to move at least one of the ejecting head or the holding portion in a direction intersecting the scanning direction.

9. The cleaning unit according to claim 1, wherein the holder includes a holding member pivotally mounted to a pivot shaft to allow detachment of the cleaning member.

10. A cleaning unit comprising:

a cleaning member configured to clean an ejecting head configured to eject liquid; and a holder detachably mounted on a holding portion that is disposed at a position faceable with the ejecting head, wherein the cleaning member is held by the holder in a state in which an absorbent body configured to absorb liquid is wrapped around an elastic body, and wherein at least one of the holding portion or the holder is made of metal, and at least the other of the holding portion or the holder includes a magnet.

11. A cleaning unit comprising:

a cleaning member configured to clean an ejecting head configured to eject liquid; and a holder detachably mounted on a holding portion that is disposed at a position faceable with the ejecting head, wherein the cleaning member is held by the holder in a state in which an absorbent body configured to absorb liquid is wrapped around an elastic body, and wherein the holder includes:

an accommodation portion configured to accommodate the cleaning member, and a gripping portion protruding from the accommodation portion.

* * * * *